United States Patent [19]
Hesdahl et al.

[11] Patent Number: 5,469,441
[45] Date of Patent: Nov. 21, 1995

[54] DIGITAL TELEPHONE COMMUNICATION SYSTEM INCLUDING AN EXCHANGE AND A SERVICE STATION CONNECTED THERETO FOR SUPPLYING PROGRAMMING INFORMATION TO USER STATIONS BY WAY OF THE B CHANNELS OF THE SYSTEM

[75] Inventors: Piet B. Hesdahl; Cornelis M. Klik, both of Hilversum, Netherlands

[73] Assignee: U.S. Philips Corporation, New York, N.Y.

[21] Appl. No.: 324,452

[22] Filed: Oct. 17, 1994

Related U.S. Application Data

[63] Continuation of Ser. No. 900,873, Jun. 18, 1992, abandoned.

[30] Foreign Application Priority Data

Jun. 21, 1991 [EP] European Pat. Off. ............... 91201592

[51] Int. Cl.⁶ ........................................................ H04J 3/12
[52] U.S. Cl. ........................................................... 370/110.1
[58] Field of Search ............................... 370/110.1, 94.1, 370/58.1, 58.2, 58.3, 60, 60.1, 62; 379/69, 70, 76, 142, 96, 266, 40, 49, 101, 105, 118, 201, 213, 216

[56] References Cited

U.S. PATENT DOCUMENTS

| | | | |
|---|---|---|---|
| 4,734,931 | 3/1988 | Bourg et al. | 379/96 |
| 4,839,919 | 6/1989 | Borges | 379/96 |
| 4,922,490 | 5/1990 | Blakley | 370/110.1 |
| 5,025,470 | 6/1991 | Thornborough et al. | 379/107 |
| 5,043,983 | 8/1991 | Dorst et al. | 370/110.1 |
| 5,050,005 | 9/1991 | Kagami | 370/110.1 |
| 5,051,992 | 9/1991 | Tamiguchi et al. | 370/96.1 |
| 5,073,890 | 12/1991 | Danielsen | 370/110.1 |

OTHER PUBLICATIONS

Helgert, "Integrated Services Digital Network", 1991, p. 49.

*Primary Examiner*—Douglas W. Olms
*Assistant Examiner*—Huy D. Vu
*Attorney, Agent, or Firm*—Leroy Eason

[57] ABSTRACT

A digital telephone communication system, for example ISDN or ESPABX, having an exchange and a plurality of user stations, the exchange communicating with each user station by at least a signalling (D) channel and a communication (B) channel of greater bandwidth. A service station is connected to the exchange in which is stored programming information for the user stations. Each user station includes a processor in which the telephone directory number of the service station is stored. Programming information available at the service station can be obtained by the processor of a user station by calling the service station, and is transmitted from the service station over the B channel. The service station may also provide unrequested programming information to any or all of the user stations over the B channels.

7 Claims, 1 Drawing Sheet

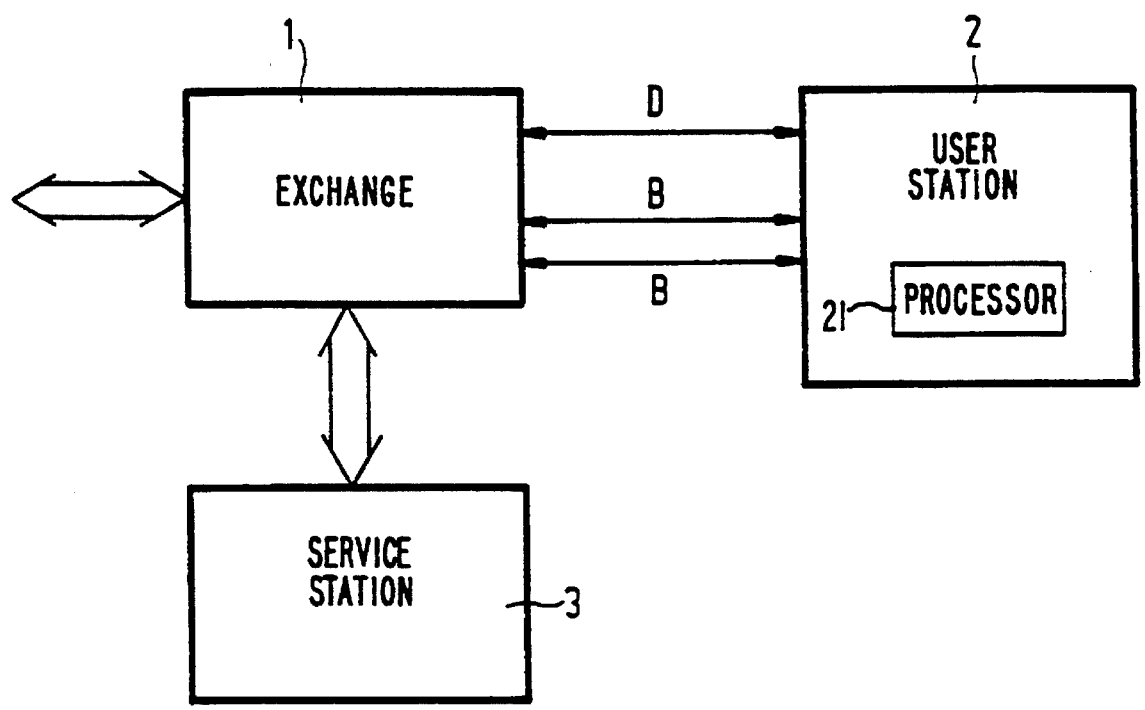

DIGITAL TELEPHONE COMMUNICATION SYSTEM INCLUDING AN EXCHANGE AND A SERVICE STATION CONNECTED THERETO FOR SUPPLYING PROGRAMMING INFORMATION TO USER STATIONS BY WAY OF THE B CHANNELS OF THE SYSTEM

This is a continuation of application Ser. No. 07/900,873, filed Jun. 18, 1992 abandoned.

BACKGROUND OF THE INVENTION

1. Field of the Invention

The invention relates to a digital telephone communication system, for example ISDN or ISPABX, comprising at least one exchange and at least one user station, the exchange communicating with the user station by way of at least a signalling (D) channel and a voice (B) channel.

2. Description of the Related Art

In digital telephone communication systems such as ISDN (Integrated Services Digital Networks) and ISPABX (Integrated Services Private Automatic Exchanges), the connected user stations are customarily programmed from the exchange. In that case the user need not program the user station himself. A simple example of this relates to a telephone terminal comprising a display device on which the name of the calling person is displayed before the telephone connection itself is established. Together with the ringing signals the exchange thereto sends the telephone number and the name of the calling person to the called person by way of the D channel. The subsequent speech signals are then transmitted over the B channel.

Further types of programming information may also be supplied to the user by the exchange. For example, the exchange may define which user facilities are assigned to each user. The exchange may also remotely program various facilities such as names, numbers, etc. under function keys of the keyboard in the user station. Even remote adjustment of the baud rate, parity and the number of stop bits of a data port in the user station is feasible in this manner. A disadvantage of such a system is that such programming information must correspond to the type of exchange used, because signal transmission by way of the D channel depends on the type of exchange used. In addition, the load on the exchange is increased according as the programming information becomes more extensive.

SUMMARY OF THE INVENTION

It is an object of the invention to obviate these drawbacks.

For this purpose, the communication system according to the invention is characterized in that a service station is provided which is connected to the exchange and which stores programming information for the user s each user station comprises a processor storing, for example, the telephone number (DNR directory number) of the service station. The programming information available in the service station is sent to a user station over the B channel.

Advantages of the invention are that by sending the programming information over the B channel it no longer depends on the type of exchange used, and that the exchange no longer needs to have a large bandwidth. Furthermore, the speed at which the programming information is transmitted may, in essence, be increased, because the capacity of the B channel is generally larger than that of the D channel.

DESCRIPTION OF THE PREFERRED EMBODIMENTS

The invention will be further explained with reference to the sole drawing FIGURE, showing a communication system according to the invention. The communication system according to the invention comprises a digital telephone exchange 1, one or a plurality of user stations 2 and a service station 3. Each user station 2 is connected in known fashion to the exchange 1 by way of a D channel for ringing/service signals and also by way of two B channels for speech and/or data signals. The D channel customarily has a capacity of 16 Kbit/s and each B channel 64 Kbit/s.

The system according to the present invention is arranged, so that programming information for the user station 2, which information is stored in the service station 3, is transmitted to the user station 2 over a B channel. This may basically be effected in two ways.

In the first embodiment of the system the (micro)processor 21 installed in the user station 2 has stored therein the telephone number (DNR directory number) of the service station 3. The processor 21 independently sends out a call to the service station for gaining access to the information stored therein. Once a connection between the user station and the service station has been established, the service station sends the desired programming information over the B channel via the exchange. The connection is then a so-called end to end protocol, which does not load the capacity of the exchange.

If the user station is a telephone set comprising a processor and a picture screen, the desired programming information may be a name belonging to a specific telephone number. The exchange sends by the D channel only the telephone number of the person who is calling the user station. The processor searches in its memory for the name belonging to that number and displays this name on the picture screen before the receiver is lifted off the hook and the calling connection is established. If the memory does not yet contain this name, the processor (afterwards) independently calls the service station via the exchange in order to obtain the desired combination of name and telephone number via the B channel.

For avoiding that a new user station, whose processor knows only few name-number combinations, independently sends out a call to the service station subsequent to each received calls which would overload the exchange at peak hours, calls from the user station to the services station may be bundled. It is also possible to program a user station in such a way that only at night, when the exchange is loaded to a minor degree, will calls to the service station be made by the user station.

In a second embodiment of the system it is not the user station which places a call but rather the service station does. The service station consecutively calls all the user stations connected to the exchange and supplies them with, the programming information desired by them. In this case it is essential that the processor in each of the user stations should have stored in its memory the telephone number of the service station and so can detect that it is the service station which is calling. The processor then suppresses signalling (ringing) as for a speech or data call, and itself receives the programming information transmitted from the service station over the B channel. If necessary, it may adopt to the baud rate of the received information.

In the case of above example of combinations of names and telephone numbers, a service station may thus update the telephone lists desired by the various user stations.

In another example an operator at the service station may remote-transmit user station setting data by way of the B channel. In this manner the setting of various user stations may be performed from one central location, each user station receiving its own specific setting data. The operator concerned may perform the setting activities via an ISPABX system within a company, or via an ISDN system to which large groups of users are connected.

We claim:

1. A digital communication system comprising an exchange and a plurality of user stations, each user station being connected to the exchange by a telephone signalling channel (D) and a telephone communication channel (B) of greater bandwidth than the D channel; characterized in that:

said system further comprises a service station connected to the exchange and having a directory number, the service station storing programming information for at least several of the user stations;

each user station comprises a processor for storing the service station directory number and programming information supplied from the service station to the user station, the processor (i) automatically calling the service station to request additional programming information required by the user station whenever a call is received from the exchange by the user station for which call programming information is not already stored in said processor, and (ii) storing programming information transmitted by the service station in response to such request; and the programming information supplied by the service station to a user station is transmitted via said exchange over a B channel.

2. A digital communication system as claimed in claim 1, wherein the processor of a user station bundles a plurality of requests for programming information for transmission as a single telephone call to the service station.

3. A digital communication system as claimed in claim 2, wherein the processor of a user station sends bundled requests for programming information to the service station during predetermined intervals when the communication system is lightly loaded.

4. A digital communication system comprising an exchange and a plurality of user stations, each user station being connected to the exchange by a telephone signalling channel (D) and a telephone communication channel (B) of greater bandwidth than the D channel; characterized in that:

said system further comprises a service station connected to the exchange and having a directory number, the service station storing programming information for at least several user stations;

each user station comprises a processor for storing the service station directory number and identification of programming information required by the user station, which programming information is to be supplied by the service station;

the service station consecutively calls each user station connected to the exchange in order to determine whether programming information is required by the called user station, and in that event supplies the required programming information to the called user station, each such call including the service station directory number;

the processor of each user station recognizes from the directory number of an incoming call whether such incoming call is from the service station, and in that event suppresses call ringing in response to such incoming call; and the programming information supplied by the service station to a user station is transmitted via said exchange over a B channel and stored by the processor of the user station.

5. A digital communication system as claimed in claim 4, wherein upon recognizing that a call is from the service station the processor of a user station establishes connection to receive programming information from the service station over a B channel of said user station.

6. A digital communication system as claimed in claim 14, wherein said service station comprises means whereby an operator at the service station can select programming information stored therein to be transmitted to one or more user stations so as to adjust operating facilities at such user stations.

7. A digital communication system as claimed in claim 4, wherein said service station comprises means whereby an operator at the service station can select programming information stored therein to be transmitted to one or more user stations so as to adjust operating facilities at such user stations.

* * * * *